Dec. 1, 1953
O. C. KUEHNE
2,661,056
GAS BURNER WITH MULTIPLE MIXER
AND SINGLE COMBUSTION CHAMBER
Filed June 29, 1951
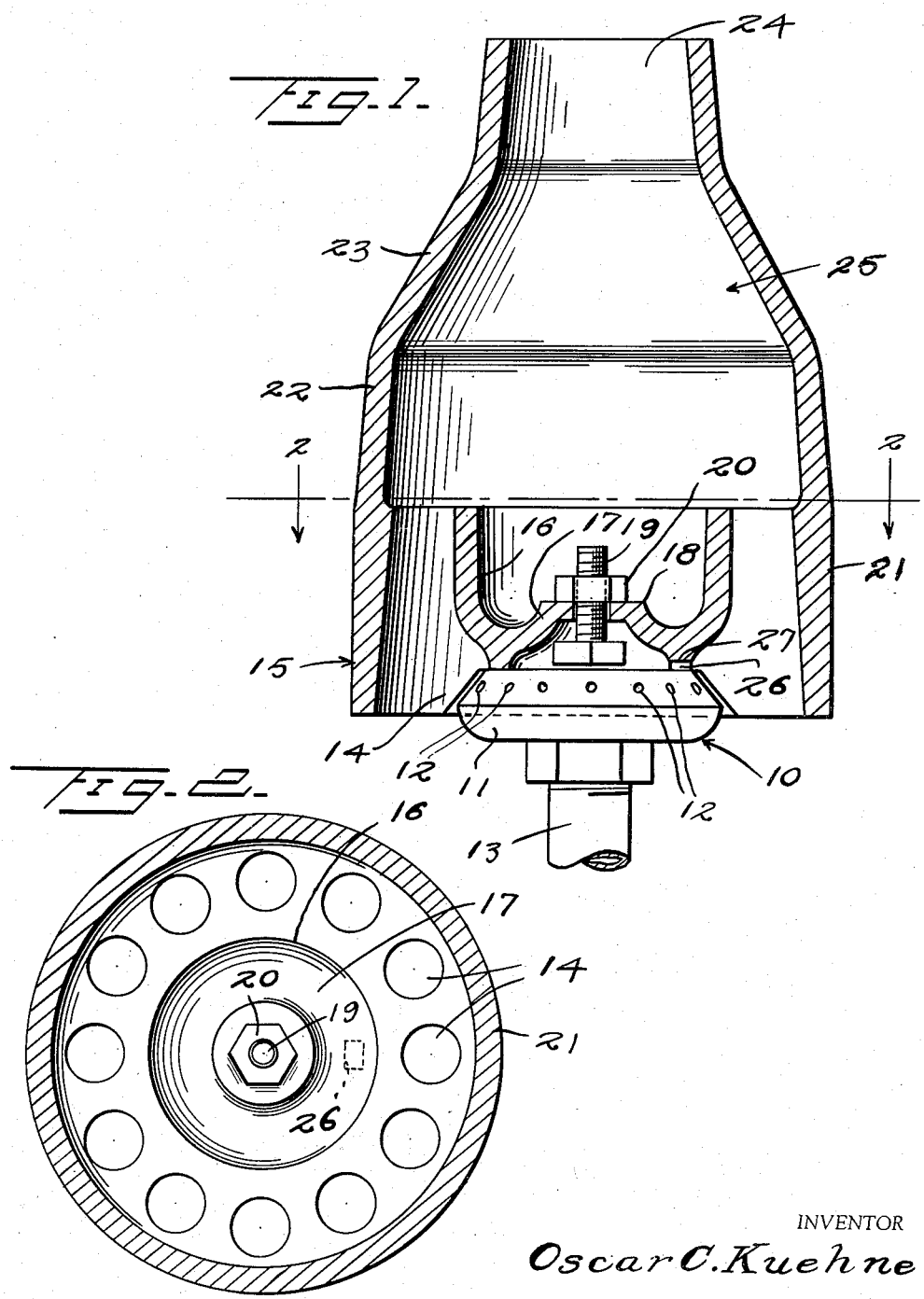
INVENTOR
Oscar C. Kuehne
BY Kimmel & Crowell
ATTORNEYS Patented Dec. 1, 1953

2,661,056

UNITED STATES PATENT OFFICE 2,661,056

GAS BURNER WITH MULTIPLE MIXER AND SINGLE COMBUSTION CHAMBER

Oscar C. Kuehne, San Antonio, Tex.

Application June 29, 1951, Serial No. 234,286

1 Claim. (Cl. 158—99)

This invention relates to a gas burner, and more particularly to a burner formed of a cast iron head having a plurality of mixing chambers therein within which the fuel is discharged from a plurality of jet openings in a multi-jet nozzle into an auxiliary mixing chamber.

A primary object of this invention is the provision of an improvement on my issued Patent No. 2,521,584, entitled Multichambered Gas Burner, issued September 5, 1950.

An additional object of the invention is the provision of an additional improved mixing chamber adapted for use with the burner of the above-entitled patent, adapted to direct the flame of cumbustion to any desired direction, either horizontal or vertical.

A further object of the invention is the provision of a burner head adapted for use with a burner of the character described, which may be readily adapted for directional diversion of the flame and which further may be varied in shape or dimension in such manner as to produce a flame of a particular desired characteristic.

Still other objects will in part be obvious and in part be pointed out as the description of the invention proceeds and shown in the accompanying drawing, wherein there is disclosed a preferred embodiment of this inventive concept.

In the drawing:

Fig. 1 is a longitudinal sectional view of one form of burner or burner head embodying features of the instant invention; and Fig. 2 is a sectional view taken substantially along the line 2—2 of Fig. 1, as viewed in the direction indicated by the arrows.

Similar reference characters refer to similar parts throughout the several views of the drawing.

Having reference now to the drawing in detail, there is generally indicated at 10 a multi-jet nozzle having a plurality of fuel dispensing apertures 12, the fuel being supplied by a centrally positioned pipe or conduit 13. Each of the apertures 12 communicates laterally with a corresponding passage 14 of the burner head, generally indicated at 15.

The burner head 15 is provided with a centrally positioned rim 16 having a base 17 with a centrally positioned aperture 18 therein through which extends a stud or bolt 19, upon which is positioned a nut 20 adapted to hold the burner head 15 in position on the multi-jet nozzle 10.

As previously mentioned, each of the fuel dispensing apertures 12 communicates with a passage 14 which extends upwardly to the level of the inner rim 16 to provide a plurality of individual fuel mixing and combustion chambers. The several mixing chambers and the advantage achieved thereby have been described in my above-mentioned patent.

In the instant invention, the outer rim 21 of the mixing head 15 is extended upwardly above the level of the inner rim 16, as indicated at 22 to provide an additional mixing chamber. The rim 22 tapers inwardly to a point at a suitable selected distance above the inner rim 16 and there assumes a frusto-conical form, as indicated at 23, converging into a relatively reduced diameter outer opening 24 which serves as a shaping and directional nozzle for the flames created by the combustion in the mixing chambers previously referred to and also by velocity of fuel.

By virtue of this auxiliary mixing chamber, generally designated at 25, the flames may be directed in any suitable direction for any desired purpose and shaped to fit various requirements.

Obviously, the device may be constructed in any desired size, the combustion chamber 25 made of any desired dimension, and the nozzle or aperture 24 of any suitable shape or diameter for proper velocity, shape and direction of the flame for any desired purpose.

The nozzle 10 is formed with as many jet openings 12 as there are mixing chambers or passages 12, and the nozzle 10 and head 15 are properly positioned relative to each other so that the jet openings will discharge into chambers 14 by means of a positioning lug 26 carried by the top of nozzle 10 which engages in a recess 27 carried by head 15.

As various embodiments may be made of this inventive concept, and as various modifications may be made in the embodiment hereinbefore set forth and described, it is to be understood that all matter herein is to be interpreted merely as illustrative and not in a limiting sense.

I claim:

A burner comprising an annular burner head having a centrally disposed recess on the under side thereof, said recess being provided with a downwardly diverging wall, a shoulder forming an annular seat about said recess intermediate the top and bottom thereof, a fuel nozzle having an upwardly converging side wall provided with spaced fuel outlets and a top wall upon which said shoulder is adapted to seat whereby the lower portion of the diverging side wall of said recess is juxtaposed with the converging side wall of said nozzle, said head being provided with a plurality of circumferentially spaced, upwardly tapered, axially disposed bores extending therethrough, each bore having an outwardly flared lower portion communicating with said recess adjacent one of said fuel outlets whereby fuel is emitted from each of said outlets into one of said bores, the latter forming a mixing chamber, an auxiliary mixing chamber formed integrally with said burner head and extending beyond said fuel nozzle, said mixing chamber being comprised of a frusto-conical extension of the outer wall of said burner head forming inclined flame striking surfaces for creating flame turbulence, and a nozzle converging at a lesser angle than said auxiliary mixing chamber formed at the extremity of said frusto-conical mixing chamber for directional guidance of the flames from said burner in alignment with said burner head in turbulent condition.

OSCAR C. KUEHNE.

References Cited in the file of this patent

UNITED STATES PATENTS

| Number | Name | Date |
|---|---|---|
| 591,046 | Kloeb | Oct. 5, 1897 |
| 2,521,584 | Kuehne | Sept. 5, 1950 |